(12) United States Patent
Wijning et al.

(10) Patent No.: US 12,305,613 B2
(45) Date of Patent: May 20, 2025

(54) METHOD AND BLADE INSTALLATION DEVICE FOR INSTALLING A BLADE OF AN OFFSHORE WIND TURBINE

(71) Applicant: Itrec B.V., Schiedam (NL)

(72) Inventors: Diederick Bernardus Wijning, Schiedam (NL); David Roodenburg, Schiedam (NL)

(73) Assignee: ITREC B.V., Schiedam (NL)

( * ) Notice: Subject to any disclaimer, the term of this patent is extended or adjusted under 35 U.S.C. 154(b) by 0 days.

(21) Appl. No.: 18/277,627

(22) PCT Filed: Feb. 16, 2022

(86) PCT No.: PCT/EP2022/053798
§ 371 (c)(1),
(2) Date: Aug. 17, 2023

(87) PCT Pub. No.: WO2022/175315
PCT Pub. Date: Aug. 25, 2022

(65) Prior Publication Data
US 2024/0133364 A1   Apr. 25, 2024
US 2024/0229771 A9   Jul. 11, 2024

(30) Foreign Application Priority Data
Feb. 18, 2021   (NL) .................................. 2027591

(51) Int. Cl.
*F03D 13/10* (2016.01)
*B66C 19/00* (2006.01)
(Continued)

(52) U.S. Cl.
CPC ............ *F03D 13/104* (2023.08); *B66C 19/00* (2013.01); *B66C 23/207* (2013.01); *F03D 13/25* (2016.05); *F05B 2230/6102* (2013.01)

(58) Field of Classification Search
CPC ........... F03D 13/25; F03D 13/10; Y02E 10/72
See application file for complete search history.

(56) References Cited

U.S. PATENT DOCUMENTS 6,614,125 B2 *   9/2003   Willis .................... F03D 13/40
                                                              290/55
8,191,878 B2 *   6/2012   Pedersen ................ F03D 80/50
                                                              269/71
(Continued)

FOREIGN PATENT DOCUMENTS

EP        2 868 914 A1       5/2015
JP      2003184730 A *   7/2003 ............. F03D 13/10
(Continued)

OTHER PUBLICATIONS

JP-2003184730-A translation (Year: 2003).*
(Continued)

*Primary Examiner* — Michael W Hotchkiss
(74) *Attorney, Agent, or Firm* — Birch, Stewart, Kolasch & Birch, LLP (57) ABSTRACT

In a method for installing a blade on a horizontal axis rotational hub of an offshore wind turbine, use is made of a blade installation device that is temporarily installed on the offshore wind turbine. The device includes a mounting part that is mounted on the foundation of the offshore wind turbine and/or on a lower portion of the wind turbine mast. A guide mast having a track is supported by the mounting part and extends parallel and adjacent to the wind turbine mast. A support bracket laterally supports the guide mast. The blade installation device further includes a blade manipulator assembly with a trolley that is movable along the track and a blade manipulator including blade engagement members. The blade manipulator is supported by the (Continued)

trolley via an actuating assembly including actuators. A positioning system controls the actuators.

17 Claims, 7 Drawing Sheets

(51) Int. Cl.
*B66C 23/20* (2006.01)
*F03D 13/25* (2016.01)

(56) References Cited

U.S. PATENT DOCUMENTS

| | | | |
|---|---|---|---|
| 8,499,455 B2* | 8/2013 | Suh | F03D 13/10 |
| | | | 29/897 |
| 9,016,029 B2* | 4/2015 | Wagner | E04H 12/342 |
| | | | 52/745.18 |
| 2002/0084142 A1* | 7/2002 | Brennan | B66B 9/187 |
| | | | 182/133 |
| 2006/0120809 A1* | 6/2006 | Ingram | E02D 27/42 |
| | | | 405/195.1 |
| 2011/0123274 A1* | 5/2011 | Soe-Jensen | F03D 13/10 |
| | | | 405/195.1 |
| 2012/0131880 A1* | 5/2012 | Delago | E04H 12/342 |
| | | | 52/745.18 |
| 2012/0266796 A1* | 10/2012 | Roodenburg | B66C 23/185 |
| | | | 405/224 |
| 2015/0298943 A1* | 10/2015 | Garcia De La Pena Razquin | B66C 23/207 |
| | | | 414/10 |
| 2015/0337798 A1* | 11/2015 | Clymans | F03D 13/10 |
| | | | 29/889 |
| 2016/0369778 A1* | 12/2016 | Davis | E04H 12/342 |
| 2019/0257292 A1* | 8/2019 | Melen | F03D 13/10 |
| 2023/0228246 A1* | 7/2023 | Geene | F03D 13/10 |
| | | | 29/889.21 |
| 2023/0399206 A1* | 12/2023 | Wijning | B66C 23/52 |

FOREIGN PATENT DOCUMENTS

| | | | |
|---|---|---|---|
| KR | 101378961 B1 * | 3/2014 | |
| KR | 10-1435376 B1 | 8/2014 | |
| SE | 532927 C2 * | 5/2010 | |
| WO | WO 2012/002809 A1 | 1/2012 | |
| WO | WO 2013/093614 A1 | 6/2013 | |
| WO | WO 2014/125461 A1 | 8/2014 | |
| WO | WO 2020/085902 A1 | 4/2020 | |

OTHER PUBLICATIONS

SE-532927-C2 translation (Year: 2010).*
KR101378961B1 translation (Year: 2014).*
International Search Report, issued in PCT/EP2022/053798, dated May 9, 2022.
Written Opinion of the International Searching Authority, issued in PCT/EP2022/053798, dated May 9, 2022.

* cited by examiner

METHOD AND BLADE INSTALLATION DEVICE FOR INSTALLING A BLADE OF AN OFFSHORE WIND TURBINE

FIELD OF THE INVENTION

The present invention relates to a method and blade installation device for installing a blade of an offshore wind turbine having a nacelle with a horizontal axis rotational hub that is arranged on top of a wind turbine mast. The device can also be used for de-installation or maintenance of the blade.

BACKGROUND OF THE INVENTION

Offshore wind turbines are in often mounted on a soil-bound foundation, e.g. on a monopile foundation, a jacket type foundation, etc. Installation of the blade, and potentially also of other components of the wind turbine, can be done from a vessel in floating condition or from a so-called jack-up type vessel.

In the wind industry, floating foundations of offshore wind turbines are seen as most promising for the future demand of wind generated electrical power. Herein the installation and/or de-installation of blades is more complex to be performed at the offshore location. In particular, at sea the installation of a blade is challenging, taking into account that nowadays wind turbine blades having a length of about 60 meters have become prominent. The challenge is further increased when the wind turbine is installed using a vessel in floating condition, so subject to sea-induced motion during the installation. Floating foundations are envisaged e.g. in deeper water, where also the vessel will be floating as the depth is too much for a jack-up type vessel. In a floating foundation situation, the wind turbine mast may be significantly more affected by the sea state during blade installation, e.g. depending on the actual design of the foundation.

A horizontal axis rotational hub of a sizable offshore wind turbine, e.g. of one or several megawatts, commonly has three blade mounting structures. Each blade mounting structure commonly includes a bearing allowing for variation of the pitch angle of the blade. The bearing commonly has a ring, e.g. an outer ring, attached to the hub body and a ring, e.g. an inner ring, to be attached to a root end of the rotor blade. In the industry a bolted connection between the root end of the blade and the blade mounting structure, e.g. the inner ring of the bearing, is the common standard. Nowadays T-bolt fastening arrangement is often employed. The bolted connection commonly involves a circular array of longitudinal bolts extending from a stern face of the root end of the blade, with the blade mounting structure having a corresponding array of bolt holes in which the longitudinal bolts are to be received. A nut is then commonly tightened on each bolt. Introducing the multitude of bolts simultaneously into the bolt holes requires an accurate alignment of the wind turbine blade relative to the blade mounting structure, which is already challenging due to the size and weight of the rotor blade, wind effects, etc. In addition, as explained, motions may result from the vessel and/or the mast being affected by the sea state.

In the industry it is commonly known to use a jack-up vessel with a major crane that is used to install the blades of the offshore wind turbine having a soil bound foundation. For example, reference is made to WO2014/125461.

WO2012/002809 discloses a jack-up vessel equipped with a lifting device that is configured to autonomously position a wind turbine blade in such a way that it can be mounted on a wind turbine tower. The lifting device comprises a pivotal boom structure and a positioning device which can be displaced along the boom.

WO2020/085902 discloses a vessel that is to be used in floating condition when installing a blade on an offshore wind turbine. The vessel is equipped with a lifting device for the blade that is dedicated to the six-o'clock installation of a wind turbine blade on the horizontal axis rotational hub. The lifting device has a pivotal boom and a wind turbine blade root end spatial orienting and support device with multiple actuators allowing multiple degrees of freedom of the movable blade root end retainer. Using this lifting device wind turbine blade is brought in a generally vertical orientation and underneath the blade mounting structure of the hub. in said six-o'clock position.

OBJECT OF THE INVENTION

The present invention aims to provide measures that allow for improved installation of a wind turbine blade on a horizontal axis rotational hub that is arranged on top of a wind turbine mast at sea. The improvement may reside in the efficiency of the blade installation, e.g. the installation requiring less time and/or effort, and/or being possible within an enlarged weather window, such as in stronger winds and/or less advantageous sea state.

SUMMARY OF THE INVENTION

The invention provides a method according to claim 1 for installing a blade on a horizontal axis rotational hub of an offshore wind turbine. The offshore wind turbine comprises a wind turbine mast that is supported by a foundation, e.g. a floating foundation, and a nacelle with a horizontal axis rotational hub provided on the top end of the wind turbine mast.

In the method use is made of a blade installation device that is adapted to be temporarily installed on the offshore wind turbine.

In the method this blade installation device is transported on a crane vessel to the offshore wind turbine, which crane vessel is equipped with a crane. The crane of the crane vessel is used for the temporary installation of the blade installation device on the offshore wind turbine.

The blade installation device comprises a mounting part that is mounted on the foundation of the offshore wind turbine and/or on a lower portion of the wind turbine mast.

The blade installation device comprises a guide mast that is erected vertically in an operational position wherein the guide mast is supported by the mounting part and extends parallel and adjacent to the wind turbine mast, the guide mast having a track.

The blade installation device comprises a support bracket that is engaged with the wind turbine mast and laterally supports the erected guide mast.

The blade installation device further comprises a blade manipulator assembly. This assembly comprises:
    a trolley engaging the track of the guide mast and being movable along the track in vertical direction,
    a trolley drive for moving the trolley along the track,
    a blade manipulator comprising blade engagement members that are provided to secure a blade relative to the blade manipulator; wherein the blade manipulator is supported by said trolley via an actuating assembly comprising actuators, which actuators are configured to enable one or more degrees of freedom of the blade manipulator relative to the trolley, a positioning system for controlling the actuators and thus the position of the blade that is secured relative to the blade manipulator;

In the method the trolley is brought in a lower blade receiving position thereof and the blade manipulator is arranged to receive a blade in a horizontal position thereof. The blade engagement members then secure the blade relative to the blade manipulator. The trolley is then moved along the track by the trolley drive in an upper blade installation position thereof.

The positioning system is operated to control the actuators so as to bring the blade that is secured relative to the blade manipulator in a mounting position thereof, e.g. in a vertical mounting position or in another mounting position, e.g. a horizontal mounting position. When in this mounting position, the blade is attached to the horizontal axis rotational hub of the offshore wind turbine.

It is advantageous that the blade manipulator assembly, including the positioning system and the trolley drive, enables a lifting and accurate positioning and/or alignment of the blade manipulator and/or of a blade secured by the blade manipulator, for example, as preferred, with a multiple degrees of freedom. This in particular facilitates the installation of a blade of an offshore wind turbine. It will be appreciated that the blade installation device may also be used in the context of the removal or de-installation of a blade from the offshore wind turbine, e.g. when a defect blade is to be exchanged for a new blade.

The blade installation device is provided with a blade manipulator that is adapted to be moved between an essentially horizontal blade receive position and a blade installation position which can be a vertical, inclined or horizontal position.

It is common to transport blades in a horizontal orientation. In view of the dimensions of a blade, it is advantageous to present the blade also in a horizontal position, or slightly offset from horizontal, to the blade manipulator.

The positioning system is provided for accurate motion control of the position of the blade manipulator relative to the trolley.

In embodiments, in the blade installation position, the blade manipulator is adapted to be brought to an essentially vertical position for mounting a blade to a nacelle of the offshore wind turbine, or for de-installing a blade from the offshore wind turbine.

In embodiments, the blade is installed in an exactly vertical orientation.

In other embodiments, the blade is installed in an inclined orientation, e.g. including an angle of 5-40° with the vertical, e.g. between 10-25°.

In another embodiment the blade is installed in an essentially horizontal orientation.

In operation of the blade installation device, the guide mast is supported by the mounting part, which is mounted on the offshore wind turbine, preferably on the foundation or the lower portion of the mast thereof. The lower blade receiving position of the trolley may be relatively close to the water surface. In the lower blade receiving position, the blade manipulator is able to receive a blade in an essentially horizontal position, e.g. the blade being handled by one or more cranes of the crane vessel or from a blade supply vessel. The horizontal position of the blades allows for the blade to be transferred between the blade supply vessel and the blade manipulator with the centre of gravity of the blade relatively close to the water surface. This not only allows for a small crane to be used for this transfer of the blade, as the crane does not need to reach to the height of the nacelle.

With a blade installation device according to the invention, a floating vessel or vessels with a small and basic crane can be used for the installation and/or exchange of wind turbine blades.

In embodiments, the guide mast is a telescopic mast construction. It is also conceivable that the guide mast comprises multiple, e.g. two parts, that are pivotable with respect to each other, e.g. so that the mast is foldable.

The blade manipulator comprises blade engagement members that are provided to secure the blade relative to the blade manipulator.

In an embodiment, the blade engagement members enable the blade manipulator to hold a blade in an essentially vertical installation position, i.e. with a root of the blade adjacent a nacelle without the blade manipulator to be moved level with the nacelle.

The guide mast that may be substantially shorter than the wind turbine mast, which may allow for a compact blade installation device which facilitates transport and installation of the blade installation device on the offshore wind turbine.

The blade installation device according to the invention comprises a mounting part configured to be mounted on the offshore wind turbine, preferably on the foundation thereof, e.g. a floating foundation or a sea floor based foundation such as a jacket, adjacent the mast of the wind turbine. The mounting part is configured to support the weight of the guide mast, the blade manipulator and the blade supported by the blade manipulator, while the guide mast is supported in the lateral direction by the wind turbine mast via a support bracket mounted to or formed integral with the guide mast, preferably provided near a top end of the guide mast. Thus, the wind turbine mast is not used to support the weight of the blade installation device, while the guide mast can be of a compact design because of the lateral support.

In embodiments, the blade manipulator comprises multiple spaced apart blade engagement members that are adapted to engage the blade at opposite sides and at a distance from a centre of gravity of the blade. This configuration of blade engagement members attributes to stably support and secure the blade. Advantageously, the engagement members are provided mobile, allowing the position of the engagement members to be tuned to distinct sizes of blades.

In embodiments, the blade engagement members comprise one or more root engagement members that are configured to engage a root end of the blade. Possibly, the root engagement members are provided optionally, or in a mobile manner, allowing the root engagement members to be provided in particular when large sized of blades are to be handled. The root end of a blade is the end being adapted to be mounted to the nacelle. The root engagement members attribute to accurate positioning of the root end relative to the blade manipulator, and the positioning system thus allows accurate positioning of the blade manipulator with respect to the trolley, and thus of the blade, in particular the root end of the blade, with respect to the offshore wind turbine.

In embodiments, the blade manipulator comprises a cradle, the cradle having a receiving opening for receiving a blade, e.g. allowing the blade to be moved in a lateral direction into the cradle. In an embodiment, the receiving opening of the cradle, when the manipulator is in the essentially horizontal position, faces upwards, such that a blade can be lowered into or lifted out of the cradle. This facilitates transfer between floating vessel and blade manipulator. Advantageously, the blade engagement members are mounted to or formed integral with the cradle.

In embodiments, a top end of the guide mast in the mounted and erected position is below a top end of the wind turbine mast, in particular below the nacelle provided on the top end of the wind turbine mast. The length of the guide mast should allow a blade at the upper blade installation position to be connected to the hub of the nacelle. When the blade is secured by the blade manipulator at a central part of the blade, this upper blade installation position, i.e. the upper end of the track of the guide mast, can be at a distance from the nacelle, the distance corresponding to part of the length of a blade from the secured part to the root end of the blade.

The mounting part of the blade installation device, in embodiments, comprises two or more movable clamping parts, which are movable between an open position in which the clamping parts are positionable against, e.g. around the foundation and/or lower end of the mast, and a closed position wherein the clamping parts have moved towards each other and clamp onto or around the foundation or lower end of the mast. Optionally, the clamping parts are interconnected.

In embodiments, the blade installation device further comprises a hoist system with a winch, a cable and a crane boom, the crane boom being configured to be erected with respect to a top end of the guide mast and supported via the guide mast. The crane boom is, e.g., mounted to a top end of the guide mast, e.g. in the vicinity of a support bracket. The crane boom is, e.g., a telescopic crane boom. The hoist system is advantageous, e.g., for the exchange or installation of gear boxes, generators or other components. Advantageously, during use, the cable of the hoist system extends along the guide mast. This allows the hoist system to act as the trolley drive for moving the trolley along the track between a lower blade receiving position and an upper blade installation position.

It is also conceivable that the trolley drive comprises a rack and pinion drive system, or that the trolley drive comprises a trolley hoist system with a winch, e.g. provided on the mounting part, and an associated wire guided over a top end of the guide mast.

In embodiments, the actuators between the trolley and the blade manipulator comprise one or more hydraulic cylinder type legs. Advantageously, the hydraulic cylinder lets are linearly extendable and retractable legs, e.g. having a stroke length of at least 1 meter.

In an embodiment, the actuators enable six degrees of freedom of the blade manipulator relative to the trolley. Such a six degrees of freedom system is e.g. known as a Stewart platform system. With six degrees of freedom there is mobility in X, Y, and Z-direction, as well as pitch, yaw, and roll. This allows accurate positioning of the blade manipulator and alignment of the blade, in particular with the nacelle onto which the blade is to be mounted or removed from.

In embodiments, the actuating assembly of the blade manipulator assembly comprise a lift arm having a free end, the lift arm being pivotably connected to the trolley about a horizontal lift arm pivot axis. An actuator forms a lift arm drive for pivoting the lift arm. The free end of the lift arm is upwardly pivotal relative to the trolley to an installation height of the blade. The blade manipulator is pivotably connected to the free end of the lift arm, which blade manipulator is pivotal about a horizontal manipulator pivot axis parallel to the lift arm pivot axis by means of an actuator forming a manipulator drive. This configuration e.g. allows to maintain a horizontal orientation of the blade during a pivoting of the lift arm around the lift arm pivot axis so as to lift the blade.

Such a lift arm allows for a guide mast that is substantially shorter than the wind turbine mast, and thus for a compact blade installation device which facilitates transport and installation of the blade installation device on the wind turbine.

The crane vessel is, for example, a monohull vessel, or a catamaran, or a jack-up vessel. The crane vessel is equipped with a crane, optionally with multiple cranes.

BRIEF DESCRIPTION OF THE DRAWINGS

The invention will further be elucidated in relation to the drawings, in which.

DETAILED DESCRIPTION OF EMBODIMENTS

FIGS. 1a-1c and 2-6 show a blade installation device 10 according to the invention.

Figure 1A:
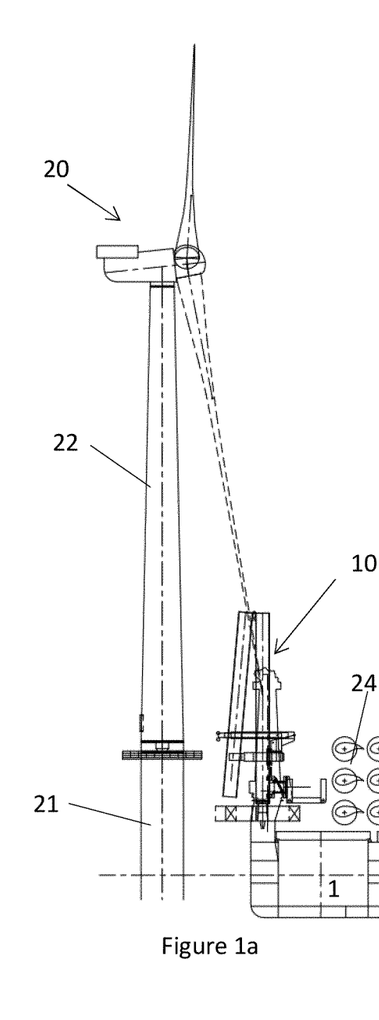
FIGS. 1a-1c show in a side view the transport of a blade installation device according to the invention and the mounting thereof.

In FIG. 1a the blade installation device 10 is transported on a crane vessel 1, together with a number of blades 24. Crane vessel 1 comprises a crane 2, here a pedestal crane comprising a pivotable boom.

An offshore wind turbine 20 is shown, comprising a foundation 21 and a wind turbine mast 22 supported by the foundation 20.

Figure 1B:
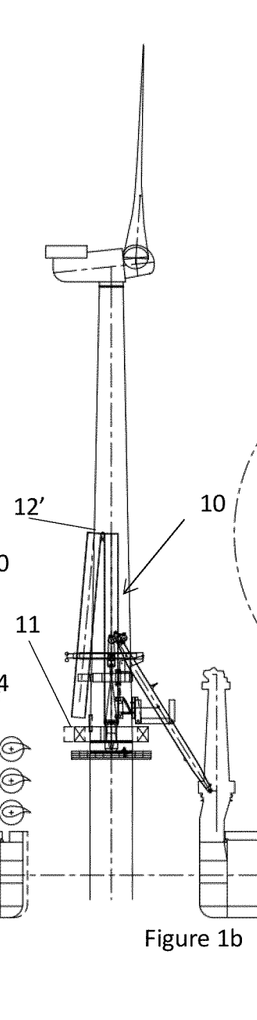
Figure 1C:
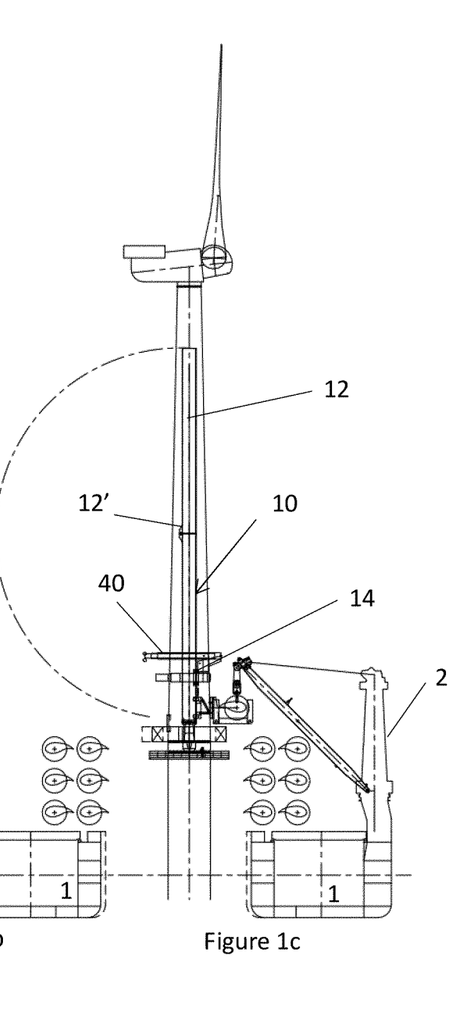

From FIGS. 1a-1c follows that the height of the crane 2 of the crane vessel 1 is substantially less than that of the wind turbine mast 22 of the offshore wind turbine 20. Hence, the crane 2 of the crane vessel is not suitable for blade installation.

In FIG. 1b is visible how the crane 2 of the crane vessel 1 hoists the blade installation device 10 to the offshore wind turbine 20, and allows the mounting of the blade installation device 10 to the foundation 21 of the wind turbine 20, such as a floating wind turbine or a wind turbine mounted to the seabed.

Mounting part 11 of the blade installation device is mounted on the foundation 21. The guide mast 12 is supported by the mounting part 11 and provided parallel and adjacent to the wind turbine mast 22.

In FIG. 1b, an upper part of the guide mast is still to be pivoted about a pivot point 12'.

In FIG. 1c the fully erected guide mast 12 is shown, wherein the guide mast 12 is supported by the mounting part 11 and extends parallel and adjacent to the wind turbine mast 22.

To bring the blade installation device 10 as shown in FIG. 1c into the operational position as shown in FIGS. 2-5 support bracket 14 is to be provided at an upper end of the guide mast 12 to engage the wind turbine mast 22 and to laterally support the guide mast 12 in the erected position.

An optional hoist system 40 is be provided at an upper part of the guide mast 12.

Figure 3:
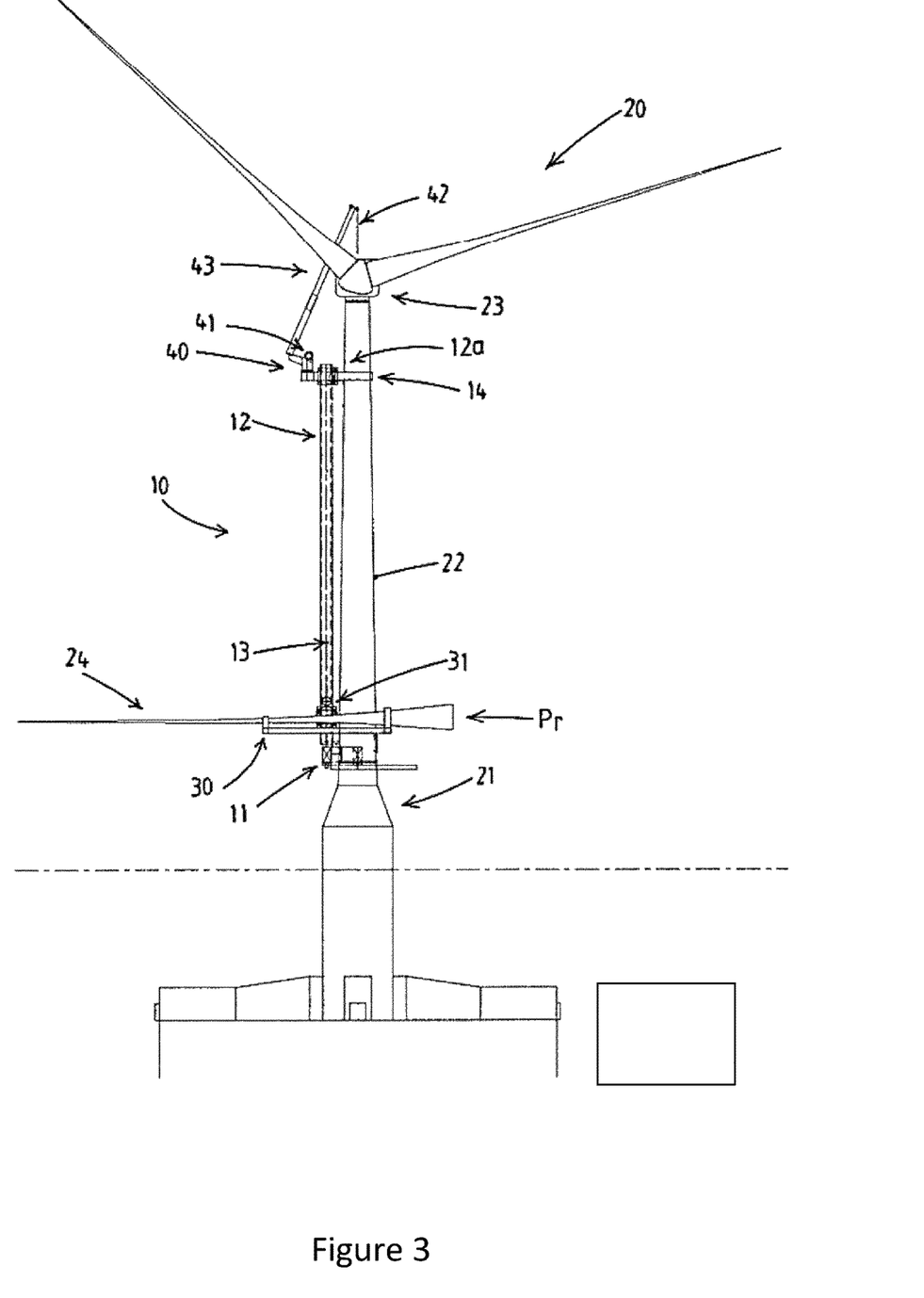
FIG. 3 shows the blade installation device of FIG. 2 in a side view, wherein a blade installation device supports a blade in horizontal position.
Figure 4:
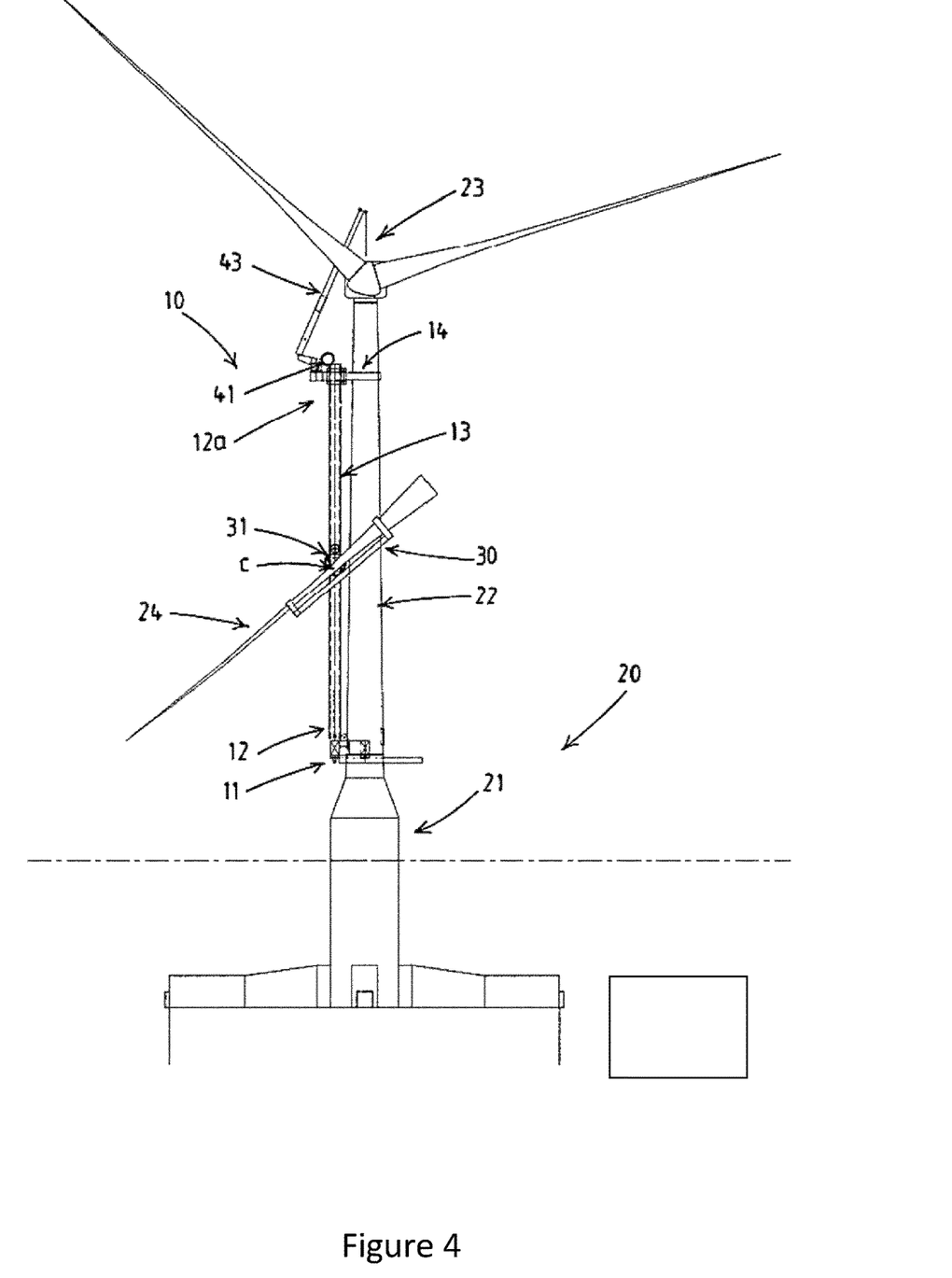
FIG. 4 shows the blade installation device of FIG. 2, wherein the blade installation device supports the blade in tilted position.
Figure 5:
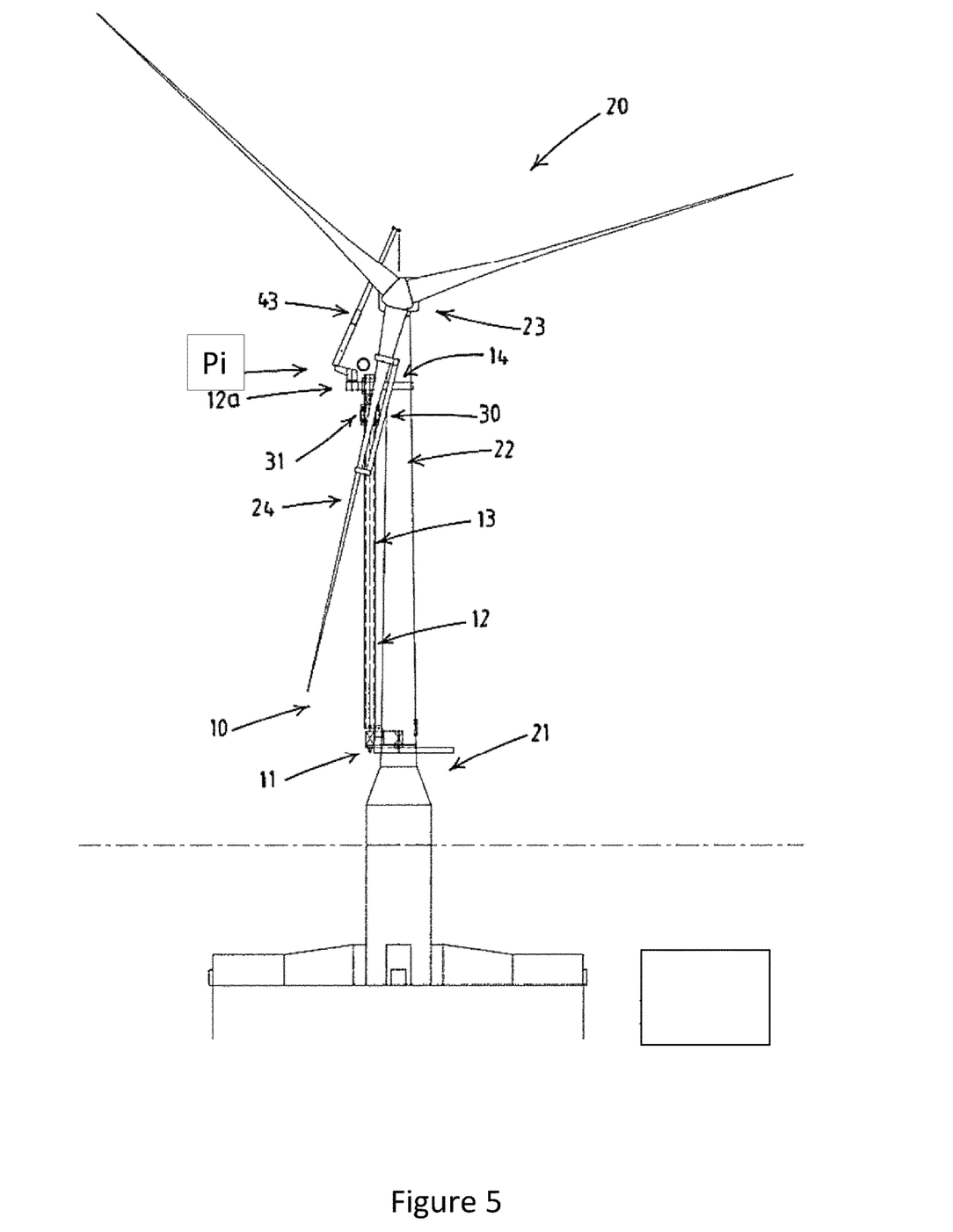
FIG. 5 shows the blade installation device FIG. 2 in a side view, wherein the blade installation device supports the blade in an essentially vertical position.

FIGS. 3-5 show subsequent working positions of a blade installation device 10 according to the invention.

As shown in FIGS. 1a-1c, the blade installation device 10 is configured be transported on a crane vessel, and is adapted to be mounted onto, and removed from, the foundation 21 of an offshore wind turbine 20. Thus, when the blades of a wind turbine need to be installed, or one or more blades need to be replaced, the blade installation device 10 can temporarily be installed on the foundation of the wind turbine to move blades into and out of a position in which they can be mounted to the nacelle of the wind turbine.

Figure 6:
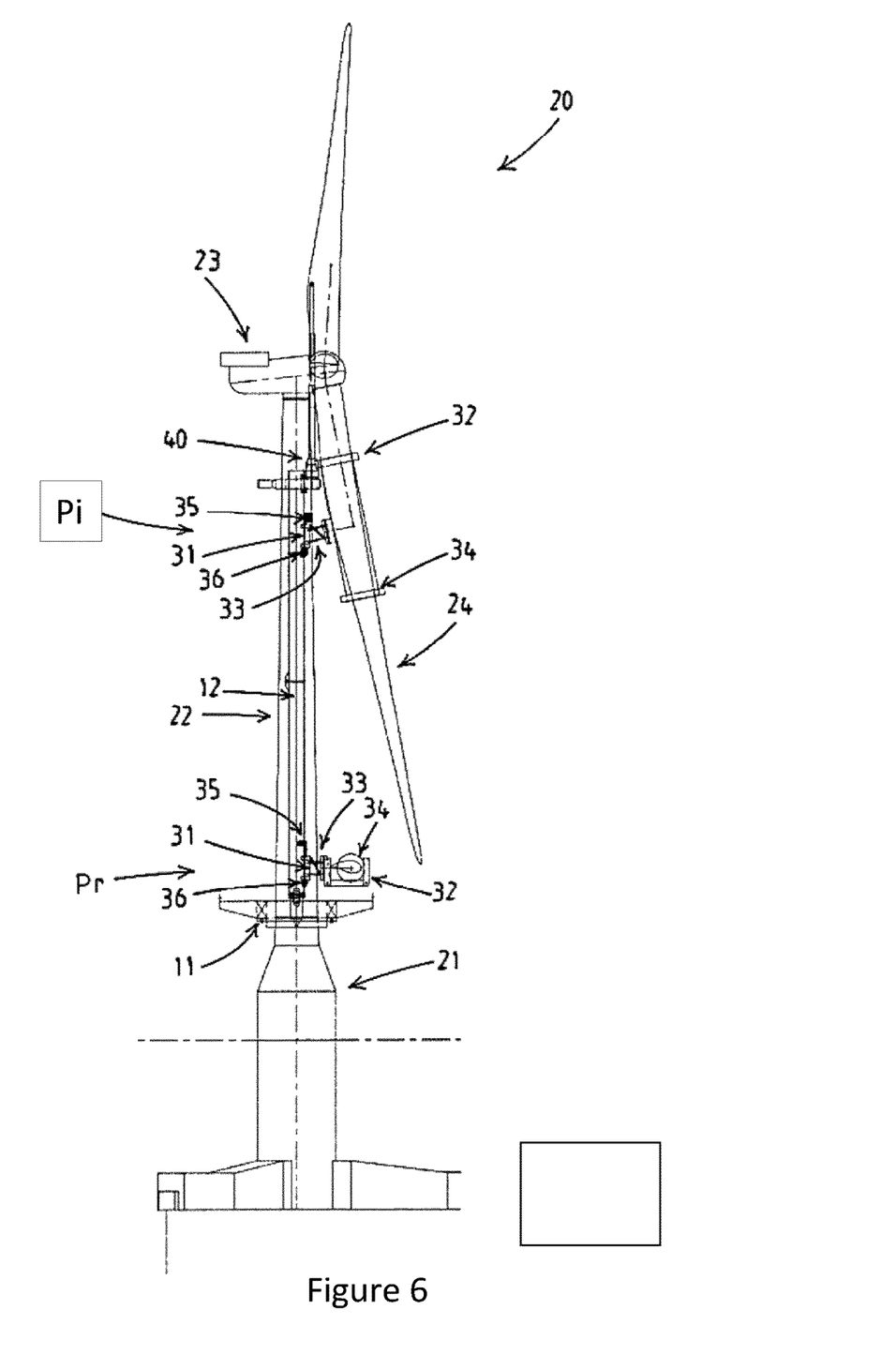
FIG. 6 shows a side view of the floating wind turbine with a blade installation device depicted in both a lower blade receiving position as shown in FIG. 3 and an upper blade installation position as shown in FIG. 5.

The blade installation device 10 comprises a mounting part 11, a guide mast 12, a support bracket 14, a blade manipulator assembly 30 and a trolley drive 36 (visible in FIG. 6).

The mounting part 11 is configured to be mounted on the foundation of the offshore wind turbine. The mounting part is, preferably, mounted to the foundation of the wind turbine, for example at the flange of the mast of the wind turbine, with which the wind turbine is mounted onto the foundation.

Once the mounting part 11 is installed, it provides a support for the guide mast 12, and allows for the guide mast to be erected on the mounting part adjacent the mast of the wind turbine 20.

The support bracket 14, mounted to or integral with the guide mast 12, is provided at a top end of the guide mast, and engages the wind turbine mast 22 to laterally support the guide mast.

The guide mast has a track 13 for guiding the blade manipulator assembly 30 in a vertical direction along a part of the wind turbine mast 22. The blade manipulator assembly 30 is adapted to be movable along the track 13.

The blade manipulator assembly 30 comprises a trolley 31, a blade manipulator 32, and a positioning system 35.

The trolley 31 is adapted to engage the track 13, and is movable along the track, thus enabling the blade manipulator assembly 30 to be moved up and down along the guide mast 12.

The blade manipulator 32 is supported by the trolley 31 via multiple actuators 33, the actuators enabling multiple degrees of freedom of the blade manipulator relative to the trolley. The blade manipulator 32 comprises blade engagement members 34 that are provided to secure the blade relative to the blade manipulator.

The positioning system 35 is configured to control the multiple actuators 33, and to thus control the position of the blade manipulator relative to the trolley The trolley drive 36 is provided for moving the trolley 31 along the track 13 between a lower blade receiving position Pr, shown in FIG. 3, and an upper blade installation position Pi, shown in FIG. 5. Both positions are also indicated in the side view of FIG. 6.

The blade manipulator 32 is adapted to, at the lower blade receiving position Pr, be brought in a horizontal position for receiving a blade 24 in a horizontal position. This is visible in FIG. 3 and FIG. 6.

The blade manipulator is furthermore adapted to, at the upper blade installation position Pi, be brought in a vertical position for mounting the blade 24 to a nacelle 23 of the offshore wind turbine. This is visible in FIG. 5 and FIG. 6.

It is noted that, in embodiments, when in the blade installation position, the blade can be supported at an angle or inclination to the vertical, the angle being in the range of 0-45°. In the particular embodiment shown, the blade manipulator is configured to support the blade in a range of 10-20°.

FIG. 4 shows the blade 24 being supported by the blade manipulator assembly 30 at a slightly angled installation position. By enabling the blade manipulator to support the blade at such an essentially vertical position, the guide mast can be mounted at a side of the wind turbine, instead of in front of the wind turbine, and still support a blade in an installation position that allows for mounting the blade to a nacelle at the front of the wind turbine.

Furthermore, the blade manipulator assembly being configured for engaging a blade at or near its centre of gravity, and for supporting the blade in an essentially vertical position allows for the guide mast to extend along only a section of the wind turbine mast. Therefore, in the exemplary embodiment shown, a top end 12a of the guide mast 12 in the mounted and erected position is below a top end of the wind turbine mast 22, in particular below a nacelle 23 provided on the top end of the wind turbine mast.

In the exemplary embodiment shown, the blade installation device 10 further comprises an optional hoist system 40 suitable for exchanging components from the nacelle of the wind turbine, e.g. for installation or replacing the gear box or generator of the wind turbine.

The hoist system 40 comprises a winch 41, a cable 42 and a crane boom 43. The crane boom is telescopic, i.e. the crane boom is configured to be erected with respect to a top end 12a of the guide mast 12 and supported via the guide mast by the foundation 21. Thus, the hoist system allows for a mast that does not extend up to, or even above, the nacelle of the offshore wind turbine.

Figure 2:
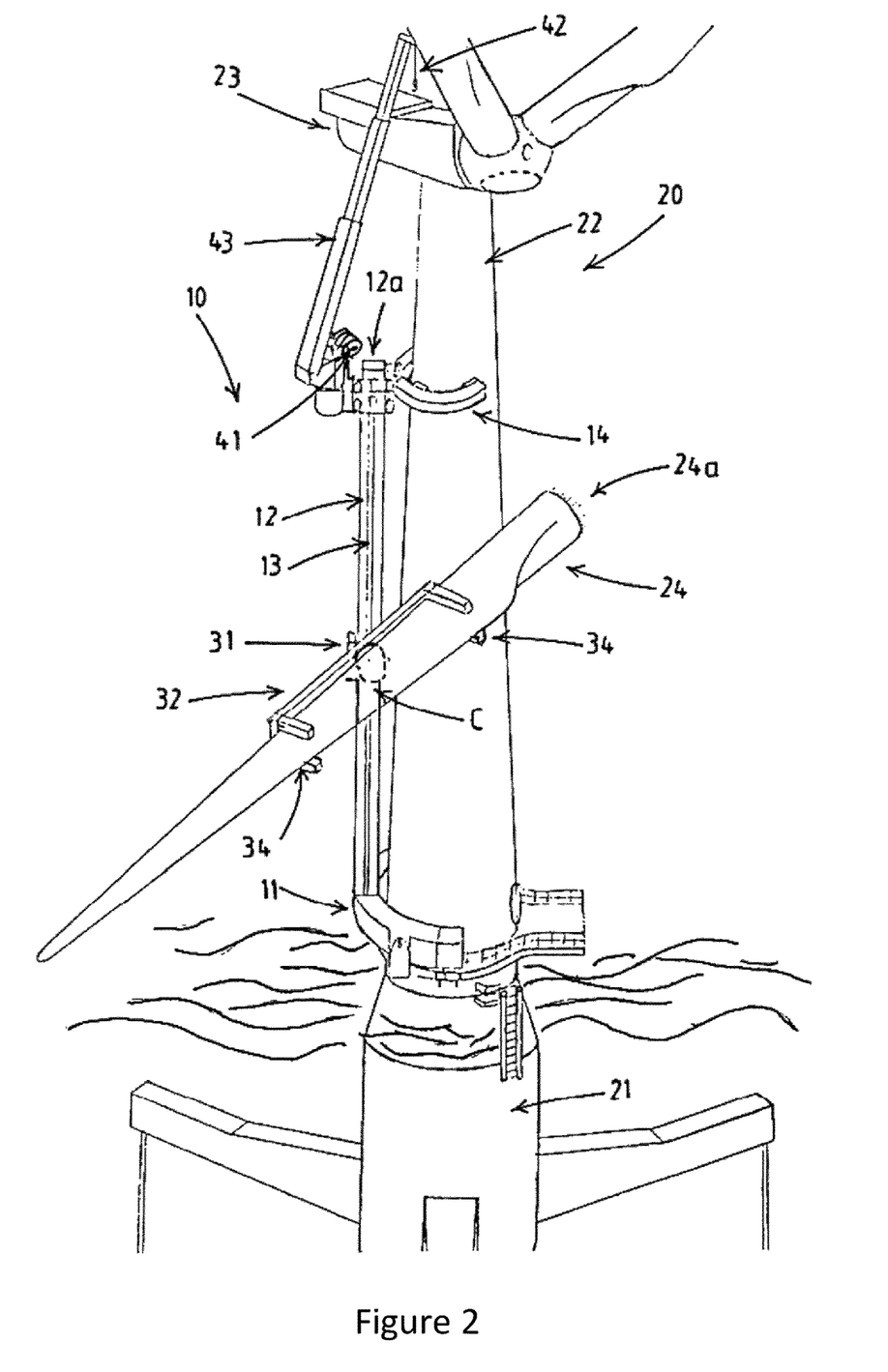
FIG. 2 shows a perspective view of the blade installation device of FIGS. 1a-1c in an operational position, mounted on a floating wind turbine, the blade installation device supporting a blade.

The blade installation device 30 enables a method for installing or maintenance of the wind turbine 20, in particular for exchanging blades of a wind turbine. The process of moving the blade into the mounting position is shown in FIGS. 2-4.

The process of installing the blade is preceded by transporting the blade installation device 10, preferably with a blade, e.g. a blade to be exchanged with a blade of the offshore wind turbine, to the offshore wind turbine with a crane vessel. In an embodiment, the crane vessel is also the blade supply vessel, i.e. the vessel that provides the blade to be installed, and that will transport the blade that is to be removed from the wind turbine.

The process of installing the blade 24 is furthermore provided by installation of the blade installation device 10 on the offshore wind turbine 20, as shown in FIGS. 1a-1c. This installation process comprises mounting the mounting part 11 of the blade installation device on the foundation 21 of the offshore wind turbine 20, and providing the guide mast in the erected position on the mounting part, with the blade manipulator assembly engaged by the track.

Preferably, the crane of the crane vessel that transported the blade installation device is used for installation of the blade installation device on the offshore wind turbine. The guide mast of the blade installation device, preferably, is configured to be erected without use of the crane of the crane vessel. In an embodiment, the mast is a telescopic mast. Alternatively, the mast is hingeable mounted on the mounting part, and is erected by being extended or erected using an internal drive. As an alternative, the guide mast may comprise multiple components and is self-erecting, like a self-erecting tower crane.

Once the blade installation device is installed on the offshore wind turbine, it can be used to move a blade in the installation position. The blade installation process comprises:
- operating the positioning system of the blade manipulator to bring the blade manipulator in the horizontal blade receiving position, shown in FIG. 2
- operating the crane vessel to present a blade in a horizontal position to the blade manipulator;
- operating the blade engagement members to secure the blade relative to the blade manipulator; and
- operating the trolley drive and the positioning system of the blade manipulator to bring the blade manipulator from the horizontal lower blade receiving position to the upper and essentially vertical blade installation position, shown in FIG. 4.

Figure 7A:
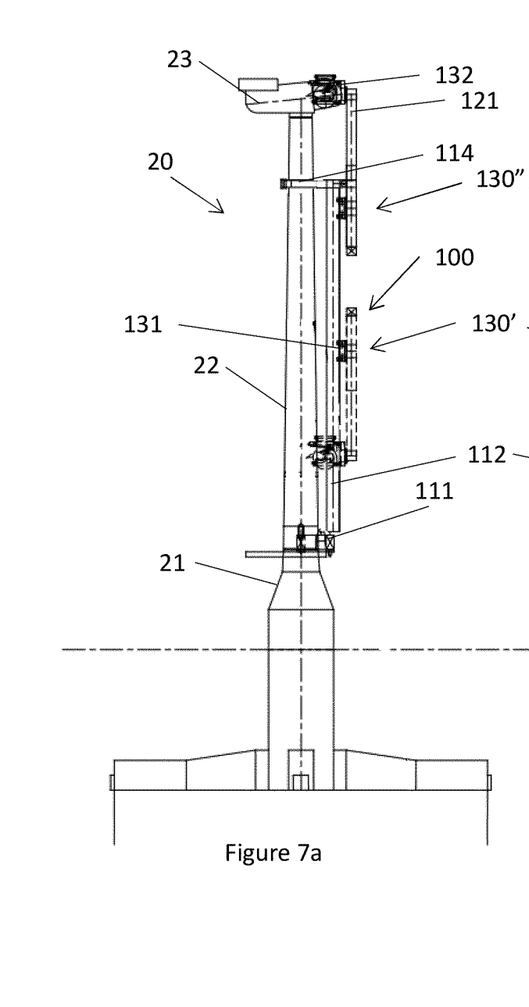
FIGS. 7a and 7b show a side and front view respectively of an alternative blade installation device according to the invention.
Figure 7B:
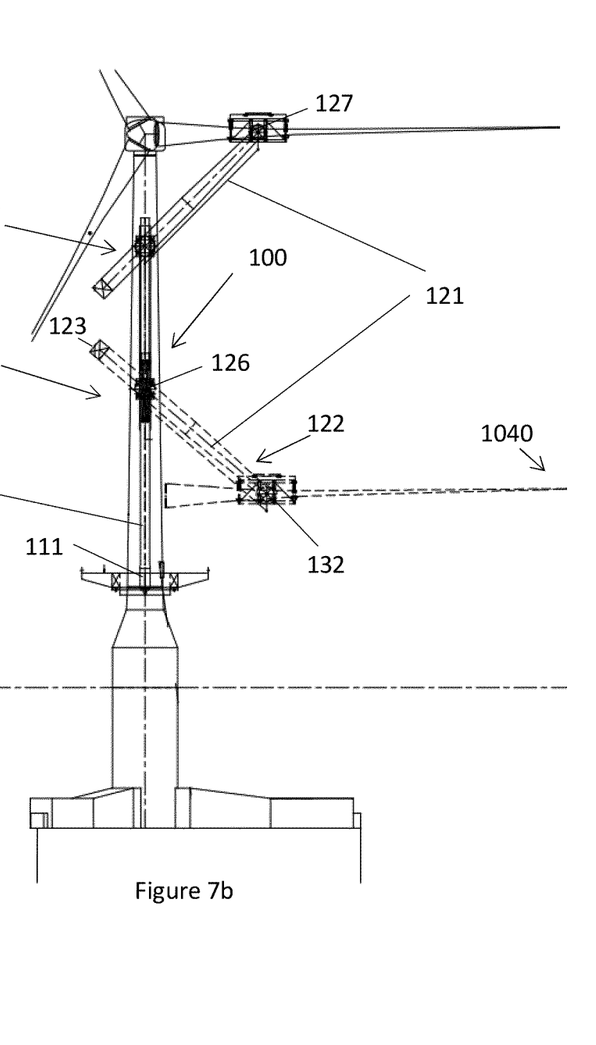

In FIGS. 7a and 7b an alternative embodiment of a blade installation device 100 according to the invention is shown, mounted to a foundation 21 of an offshore wind turbine 20, the offshore wind turbine further comprising a wind turbine mast 22 supported by the foundation.

The blade installation device 100 comprises a mounting part 111, mounted on the foundation 21 of the offshore wind turbine.

A guide mast 112 is erected to an operational position wherein the guide mast is supported by the mounting part 111, parallel and adjacent to the wind turbine mast 22.

The guide mast 112 has a track, not shown in detail. A support bracket 114 is mounted to an upper end of the guide mast 112 and engages the wind turbine mast 22 and to laterally support the erected guide mast 112.

A blade manipulator assembly 130 is movable along the guide mast, and shown in two positions indicated by reference numbers 130' and 130" in FIGS. 7a and 7b.

The blade manipulator assembly 130 comprises a trolley 131 engaging the track and being movable along the track by a trolley drive, e.g. as discussed herein.

Blade manipulator assembly 130 further comprises a blade manipulator 132 comprising blade engagement members (not shown in detail) that are provided to secure the blade relative to the blade manipulator.

The blade manipulator assembly 130 further comprises an actuating assembly with actuators configured to enable one or more degrees of freedom of the blade manipulator 132 relative to the trolley 131.

Here the actuating assembly of the blade manipulator assembly comprise a lift arm 121 having a free end 122, the lift arm being pivotably connected to the trolley 131 about a horizontal lift arm pivot axis 126.

In an example, the lift arm has an angle of between 30 and 80 degrees with the horizontal plane after the pivoting, for example between 40 and 60 degrees, for example 45-50 degrees. In an example the lift arm has an angle of between −30 and −80 degrees with the horizontal plane wen receiving the blade, so prior to the upward pivoting to lift the blade, for example between −40 and −60 degrees, for example −45 degrees.

At an opposite end the lift arm 121 is here provided with a counter weight 123 for counteracting a force moment exerted by the blade to be held relative to the lift arm connection to the trolley. This counterweight has the effect of displacing the center of gravity of the lift arm towards the lift arm pivot axis. Thereby, the moment arm of the force moment exerted relative to the pivot axis is reduced, and thereby, the moment itself. This may favor the load profile of the guide mast, in particular any bending stress.

The free end 122 of the lift arm is pivotal relative to the trolley 131, e.g. to reach an installation height of the blade 1040. An actuator between the trolley and the lit arm (not shown) forms a lift arm drive.

The blade manipulator 132 is pivotally connected to the free end 122 of the lift arm, which blade manipulator is pivotal about a horizontal manipulator pivot axis 127, parallel to the lift arm pivot axis 126 by means of an actuator forming a manipulator drive (not shown).

A positioning system is provided for controlling the lift arm drive and the manipulator drive and thus the position of the position of the blade 1040 secured by the blade manipulator 132 relative to the trolley 131.

Not shown is a trolley drive for moving the trolley along the track between a lower blade receiving position, with the blade manipulator assembly at the position indicted with 130', and an upper blade installation position with the blade manipulator assembly at the position indicted with 130". At the lower blade receiving position the blade manipulator 132 is brought in a horizontal position for receiving a blade 1040 in a horizontal position. In this embodiment at the upper blade installation position the blade manipulator is also in a horizontal mounting position for mounting the blade 1040 to a nacelle 23 of the offshore wind turbine.

The pivoting of the lift arm 121 combined with the vertical motion of the trolley 131, and thus of the lift arm 121 as well, allow to controllably move the horizontally oriented blade upward while making use of the stability of the guide mast 112 relative to the wind turbine. Thus, when lifting the blade, the movement of the blade is restricted to follow the movement of the free end of the arm 121, as the blade is effectively secured thereto. This is in contrast to lifting of the blade by suspending it from a hoisting cable, e.g. using a major crane onboard a vessel as in the prior art, where practice shows that the blade is susceptible to undue movement, e.g. caused by wind and/or vessel motion.

It is illustrated in FIGS. 7a, b that the blade is moved in a vertical plane that is parallel to and to the rear of the plane of motion of the lift arm 121. In appropriate embodiments, the plane of the blade is close to the plane of the lift arm 121, which reduces the moment arm of the force exerted by the weight of the blade on the guide mast 112, as it is held relatively close to the guide mast.

The lift arm version enables that, in embodiments, after the upwardly displacing of the free end of the lift arm 121 to an installation height, the free end of the lift arm, and therefore the securely held rotor blade, extends higher than the top of the guide mast 112. Thus, the lift arm 121 then functions as an extension above the guide mast 112—so that the guide mast advantageously needs less height.

In an embodiment, the method further comprises, (just) prior to the mounting of the blade, aligning the blade with a hub connection of the hub for the blade. For example, the blade is aligned to cause alignment between bolts on the root of the blade with bolt holes in the blade mounting of the hub. In an example this is done by moving the blade by actuating one or more alignment actuators. This alignment mechanism may be integrated with the lift arm and/or the blade manipulator, e.g. the cradle that that accommodates the blade during installation. For example, the alignment mechanism allows for alignment in any one or more directions.

In an embodiment, the blade manipulator 132 comprises a cradle that is configured to accommodate the blade, e.g. to support the horizontally orientated blade from below, e.g. clamping the blade from above, and is configured for holding the blade horizontally.

In an embodiment, the manipulator 132 comprises a cradle that is releasable from the lift arm and that has a connector for securing the cradle to a coupler of the lift arm 121. In an embodiment, the cradle comprises an attachment portion for suspending the cradle from a crane, e.g. from a crane hook, e.g. via one or more slings. In embodiments, this allows for a method wherein the blade is first lifted by means of a crane engaging on the cradle in which the blade is secured and held horizontally. For example, the blade is transferred in this manner from a supply vessel, or from the crane vessel, to the already installed blade installation device. This cradle plus blade is then transferred by the crane and then secured via its connector to the coupler at the free end of the lift arm. Then the crane can be released from the cradle. Thus, there is no need to remove the blade from the cradle for this transfer from the vessel crane to the lift arm.

The invention claimed is:

1. A blade installation device configured to be temporarily installed on an offshore wind turbine for installing a blade on a horizontal axis rotational hub of the offshore wind turbine, the offshore wind turbine comprising a wind turbine mast that is supported by a foundation and a nacelle with a horizontal axis rotational hub provided on a top end of the wind turbine mast, wherein the blade installation device is transportable on a crane vessel to the offshore wind turbine, the blade installation device comprising:
   a mounting part that is mounted on the foundation of the offshore wind turbine and/or on a lower portion of the wind turbine mast;
   a guide mast that is erected vertically in an operational position, wherein the guide mast is supported by the mounting part and extends parallel and adjacent to the wind turbine mast, the guide mast having a track;
   a support bracket that is engaged with the wind turbine mast and laterally supports the erected guide mast; and
   a blade manipulator assembly comprising:
      a trolley engaging the track of the guide mast and being movable along the track in a vertical direction;
      a trolley drive for moving the trolley along the track;
      a blade manipulator comprising blade engagement members that are provided to secure a blade relative to the blade manipulator, wherein the blade manipulator is supported by said trolley via an actuating assembly comprising actuators, the actuators being configured to enable one or more degrees of freedom of the blade manipulator relative to the trolley; and
      a positioning system for controlling the actuators and thus the position of the blade that is secured relative to the blade manipulator,
   wherein the trolley is configured to be brought in a lower blade receiving position thereof and the blade manipulator is configured to be arranged to receive a blade in a horizontal position thereof, wherein the blade engagement members are configured to secure the blade relative to the blade manipulator,
   wherein the trolley is movable along the track by the trolley drive in an upper blade installation position thereof, and wherein the positioning system is configured to be operated to control the actuators so as to bring the blade that is secured relative to the blade manipulator in a mounting position thereof allowing for the blade in said mounting position to be attached to the horizontal axis rotational hub of the offshore wind turbine, and
   wherein the blade installation device further comprises a hoist with a winch, a cable and a crane boom, the crane boom being configured to be erected with respect to a top end of the guide mast and supported via the guide mast by the foundation.

2. The blade installation device according to claim 1, wherein the actuators enable six degrees of freedom of the blade manipulator relative to the trolley.

3. The blade installation device according to claim 1, wherein the mounting position is vertical.

4. The blade installation device according to claim 1, wherein the guide mast is configured so that the top end of the guide mast in the mounted and erected position thereof is below the top end of the wind turbine mast.

5. A blade installation device configured to be temporarily installed on an offshore wind turbine for installing a blade on a horizontal axis rotational hub of the offshore wind turbine, the offshore wind turbine comprising a wind turbine mast that is supported by a foundation and a nacelle with a horizontal axis rotational hub provided on a top end of the wind turbine mast, wherein the blade installation device is transportable on a crane vessel to the offshore wind turbine, the blade installation device comprising:
   a mounting part that is mounted on the foundation of the offshore wind turbine and/or on a lower portion of the wind turbine mast;
   a guide mast that is erected vertically in an operational position, wherein the guide mast is supported by the mounting part and extends parallel and adjacent to the wind turbine mast, the guide mast having a track;
   a support bracket that is engaged with the wind turbine mast and laterally supports the erected guide mast; and
   a blade manipulator assembly comprising:
      a trolley engaging the track of the guide mast and being movable along the track in a vertical direction;
      a trolley drive for moving the trolley along the track;
      a blade manipulator comprising blade engagement members that are provided to secure a blade relative to the blade manipulator, wherein the blade manipulator is supported by said trolley via an actuating assembly comprising actuators, the actuators being configured to enable one or more degrees of freedom of the blade manipulator relative to the trolley; and
      a positioning system for controlling the actuators and thus the position of the blade that is secured relative to the blade manipulator,
   wherein the trolley is configured to be brought in a lower blade receiving position thereof and the blade manipulator is configured to be arranged to receive a blade in a horizontal position thereof, wherein the blade engagement members are configured to secure the blade relative to the blade manipulator,
   wherein the trolley is movable along the track by the trolley drive in an upper blade installation position thereof, and wherein the positioning system is configured to be operated to control the actuators so as to bring the blade that is secured relative to the blade manipulator in a mounting position thereof allowing for the blade in said mounting position to be attached to the horizontal axis rotational hub of the offshore wind turbine,
   wherein the mounting position is horizontal and wherein the actuating assembly of the blade manipulator assembly comprises a lift arm having a free end, the lift arm being pivotally connected to the trolley about a horizontal lift arm pivot axis,
wherein a first actuator of the actuating assembly forms a lift arm drive for pivoting the lift arm,
wherein the blade manipulator is pivotally connected to the free end of the lift arm about a horizontal manipulator pivot axis that extends parallel to the lift arm pivot axis,
wherein a second actuator of the actuating assembly forms a manipulator drive, and
wherein the actuators of the actuating assembly are controlled so that a horizontal orientation of the blade is maintained during a pivoting of the lift arm around the lift arm pivot axis so as to lift the blade.

6. The blade installation device according to claim 5, wherein the mounting position is vertical.

7. The blade installation device according to claim 5, wherein the guide mast is configured so that a top end of the guide mast in the mounted and erected position thereof is below the top end of the wind turbine mast.

8. The blade installation device according to claim 5, wherein the actuators enable six degrees of freedom of the blade manipulator relative to the trolley.

9. The blade installation device according to claim 8, wherein the mounting position is vertical.

10. A method for installing a blade on a horizontal axis rotational hub of an offshore wind turbine, the offshore wind turbine comprising a wind turbine mast that is supported by a foundation and a nacelle with a horizontal axis rotational hub provided on a top end of the wind turbine mast, the method comprising:
    using a blade installer that is adapted to be temporarily installed on the offshore wind turbine;
    transporting the blade installer on a crane vessel to the offshore wind turbine, the crane vessel being equipped with a crane;
    using the crane of the crane vessel for the temporary installation of the blade installer on the offshore wind turbine,
    wherein the blade installer comprises:
        a mounting part that is mounted on the foundation of the offshore wind turbine and/or on a lower portion of the wind turbine mast;
        a guide mast that is erected vertically in an operational position, wherein the guide mast is supported by the mounting part and extends parallel and adjacent to the wind turbine mast, the guide mast having a track;
        a support bracket that is engaged with the wind turbine mast and laterally supports the erected guide mast; and
        a blade manipulator assembly comprising:
            a trolley engaging the track of the guide mast and being movable along the track in a vertical direction;
            a trolley drive for moving the trolley along the track;
            a blade manipulator comprising blade engagement members that are provided to secure a blade relative to the blade manipulator, wherein the blade manipulator is supported by said trolley via an actuating assembly comprising actuators, the actuators being configured to enable one or more degrees of freedom of the blade manipulator relative to the trolley; and
            a positioning system for controlling the actuators and thus the position of the blade that is secured relative to the blade manipulator;
    bringing the trolley in a lower blade receiving position thereof and arranging the blade manipulator to receive a blade in a horizontal position thereof, wherein the blade engagement members secure the blade relative to the blade manipulator;
    then moving the trolley along the track by the trolley drive in an upper blade installation position thereof, and operating the positioning system to control the actuators so as to bring the blade that is secured relative to the blade manipulator in a mounting position thereof; and
    attaching the blade in said mounting position to the horizontal axis rotational hub of the offshore wind turbine.

11. The method according to claim 10 wherein the mounting position is vertical.

12. The method according to claim 10, wherein the mounting position is horizontal and wherein the actuating assembly of the blade manipulator assembly comprises a lift arm having a free end, the lift arm being pivotally connected to the trolley about a horizontal lift arm pivot axis,
wherein a first actuator of the actuators of the actuating assembly forms a lift arm drive for pivoting the lift arm,
wherein the blade manipulator is pivotally connected to the free end of the lift arm about a horizontal manipulator pivot axis that extends parallel to the lift arm pivot axis,
wherein a second actuator of the actuators of the actuating assembly forms a manipulator drive, and
wherein the actuators of the actuators of the actuating assembly are controlled so that a horizontal orientation of the blade is maintained during a pivoting of the lift arm around the lift arm pivot axis so as to lift the blade.

13. The method according to claim 10 wherein a top end of the guide mast in the mounted and erected position thereof is below the top end of the wind turbine mast.

14. The method according to claim 10, wherein the blade installer further comprises a hoist with a winch, a cable and a crane boom, the crane boom being configured to be erected with respect to a top end of the guide mast and supported via the guide mast by the foundation, and
wherein the hoist is used for exchanging a component from the nacelle of the wind turbine.

15. The method according to claim 10, wherein the actuators enable six degrees of freedom of the blade manipulator relative to the trolley.

16. The method according to claim 15, wherein the mounting position is vertical.

17. The method according to claim 15, wherein the mounting position is horizontal and wherein the actuating assembly of the blade manipulator assembly comprises a lift arm having a free end, the lift arm being pivotally connected to the trolley about a horizontal lift arm pivot axis,
wherein a first actuator of the actuators of the actuating assembly forms a lift arm drive for pivoting the lift arm,
wherein the blade manipulator is pivotally connected to the free end of the lift arm about a horizontal manipulator pivot axis that extends parallel to the lift arm pivot axis,
wherein a second actuator of the actuators of the actuating assembly forms a manipulator drive, and
wherein the actuators of the actuators of the actuating assembly are controlled so that a horizontal orientation of the blade is maintained during a pivoting of the lift arm around the lift arm pivot axis so as to lift the blade.

* * * * *